(12) United States Patent
Gao et al.

(10) Patent No.: US 8,479,031 B2
(45) Date of Patent: Jul. 2, 2013

(54) SYSTEM SWITCHING UNIT HAVING A SWITCH TO SWITCH ON/OFF A CHANNEL FOR DATA INTERACTION BETWEEN A FIRST SYSTEM AND THE BUS INTERFACE OF A SECOND SYSTEM ACCORDING TO THE OPERATION STATE OF THE SECOND SYSTEM

(75) Inventors: Jinxuan Gao, Beijing (CN); Xiaojian Ding, Beijing (CN)

(73) Assignee: Lenovo (Beijing) Limited (CN)

( * ) Notice: Subject to any disclaimer, the term of this patent is extended or adjusted under 35 U.S.C. 154(b) by 554 days.

(21) Appl. No.: 12/567,935

(22) Filed: Sep. 28, 2009

(65) Prior Publication Data

US 2010/0088531 A1    Apr. 8, 2010

(30) Foreign Application Priority Data

Oct. 8, 2008    (CN) .......................... 2008 1 0223595

(51) Int. Cl.
*G06F 1/00*    (2006.01)
(52) U.S. Cl.
USPC .......................................................... 713/323
(58) Field of Classification Search
USPC .......................................................... 713/323
See application file for complete search history.

(56) References Cited

U.S. PATENT DOCUMENTS

| | | | |
|---|---|---|---|
| 6,631,474 B1 * | 10/2003 | Cai et al. ........................ | 713/300 |
| 7,089,431 B2 * | 8/2006 | Matsuo et al. ................ | 713/300 |
| 7,500,128 B2 | 3/2009 | Wong et al. | |
| 7,779,280 B2 * | 8/2010 | Shuster ......................... | 713/320 |
| 7,925,900 B2 * | 4/2011 | Parks et al. ................... | 713/300 |
| 8,180,937 B2 * | 5/2012 | Ramsdale ...................... | 710/38 |
| 2005/0132239 A1 * | 6/2005 | Athas et al. .................. | 713/300 |
| 2006/0129861 A1 * | 6/2006 | Kee et al. ...................... | 713/323 |
| 2008/0244289 A1 * | 10/2008 | LeProwse et al. ............ | 713/320 |

FOREIGN PATENT DOCUMENTS

CN    101171564 A    4/2008

* cited by examiner

*Primary Examiner* — Thomas Lee
*Assistant Examiner* — Xuxing Chen
(74) *Attorney, Agent, or Firm* — Schwegman Lundberg & Woessner, P.A.

(57) ABSTRACT

Disclosed is a hybrid-system computer comprising a first system, a second system and a power supply unit, wherein the power supply unit is connected to the first system and the second system, respectively, and wherein power consumption in an operating state of the second system is lower than that in an operating state of the first system; the hybrid-system computer further comprises: a triggering unit configured for obtaining a switching command when the first system is in an operating state and the second system is in a non-operating state; and a switching unit connected to the triggering unit, the first system and the second system, respectively, and configured for receiving the switching command and controlling the first system to enter a non-operating state and the second system to enter an operating state based on the switching command. With the hybrid-system computer, in the case that only low power consumption applications are required, the first system is caused to enter a non-operating state, and the second system is put into an operating state. Therefore, the overall power consumption can be effectively reduced.

12 Claims, 2 Drawing Sheets

SYSTEM SWITCHING UNIT HAVING A SWITCH TO SWITCH ON/OFF A CHANNEL FOR DATA INTERACTION BETWEEN A FIRST SYSTEM AND THE BUS INTERFACE OF A SECOND SYSTEM ACCORDING TO THE OPERATION STATE OF THE SECOND SYSTEM

RELATED APPLICATION

This application claims priority under 35 U.S.C. 119 from Chinese Application No. 200810223595.1 filed 8 Oct. 2008, which application is incorporated herein by reference.

FIELD OF THE INVENTION

The present invention relates to the field of computer technology, particularly to a hybrid-system computer.

BACKGROUND OF THE INVENTION

With constant improvement of performance of a computer system, power consumption becomes increasingly higher. In most situations, however, low power consumption and processing capabilities are sufficient to meet a user's work requirement, for example, document editing, music playing, network browsing, etc. High processing speed and power consumption requirement are needed only in some infrequent special situations, e.g., running a large-scale 3D game, high-quality image or video processing, etc. Therefore, in most cases, a computer system may provide excessively high processing capabilities to the user, resulting in unnecessary power consumption and waste of energy resources. For a computer system using battery as power supply, such as a laptop computer, this will lead to a non-ideal duration of battery, and even affect the user's normal operation in some severe situation.

In order to address the above problem, a power supply management scheme is generally employed to set a plurality of states, such as dormancy, sleep and standby, for the computer system, and different power supply schemes are used in the respective states. For example, screen luminance is reduced during music playing, or a processing speed of CPU is lowered when during document edition.

The above scheme, however, has disadvantages in that there is no significant reduction in the overall power consumption of the computer system, because the CPU is still running despite its lowered processing speed, and a mainboard chip set, a memory, a hard disk and the like are also still in an operating state. In fact, the power consumption of CPU accounts for only about 10% of the overall power consumption of the system, while the mainboard chip set of a main board, the internal memory and the like, which are running in a normal manner, consume a primary part of the electric power.

Various manufacturers of fitting parts consider performance improvement and power consumption reduction as one of main targets when developing new products. Although great progress has been made in this aspect, there is rarely some solution in terms of an overall technique of the computer system.

SUMMARY OF THE INVENTION

An object of the present invention is to provide a hybrid-system computer in which power consumption can be effectively reduced during operation of the computer.

To achieve the above object, the present invention provides a hybrid-system computer comprising a first system, a second system and a power supply unit, wherein the power supply unit is connected to the first system and the second system, respectively, and wherein power consumption in an operating state of the second system is lower than that in an operating state of the first system, the hybrid-system computer further comprises:

a triggering unit configured for obtaining a switching command when the first system is in an operating state and the second system is in a non-operating state; and a switching unit connected to the triggering unit, the first system and the second system, respectively, and configured for receiving the switching command and controlling the first system to enter a non-operating state and the second system to enter an operating state based on the switching command.

The switching unit comprises a control module for transmitting a control command to each of the first system and the second system, after receiving the switching command, the first system transits from the operating state to the non-operating state after receiving the control command, and the second system transits from the non-operating state to the operating state after receiving the control command.

The triggering unit is a switch triggering key or a switch triggering software module.

The hybrid-system computer further comprises a basic input device and a display device, the switching unit is further configured for, when the second system transits from the non-operating state to the operating state, shielding a video signal of the first system, switching input of a video signal of the second system to the display device, and switching input of an input signal of the basic input device to the second system.

The first system comprises a south bridge and a north bridge, the north bridge is configured for processing the video signal of the first system and inputting it to the switching unit; and the south bridge is configured for receiving and processing the input signal of the basic input device inputted via the switching unit.

The second system comprises an embedded processor, a video output module, an internal low-speed bus interface, a nonvolatile memory and a volatile memory, the nonvolatile memory is configured for storing data permanently;

the volatile memory is configured for obtaining data from the nonvolatile memory and storing data temporarily;

the embedded processor is configured for, based on the received input signal of the basic input device, obtaining data from the volatile memory and performing operations and processing on the data;

the video output module is configured for inputting to the switching unit the video signal generated after the processing by the embedded processor; and the internal low-speed bus interface is configured for receiving the input signal of the basic input device inputted via the switching unit and transmitting it to the embedded processor.

The switching unit further comprises a display arbitration module, a video conversion module and a full speed USB switch, the control module is further configured for transmitting a GPIO signal to each of the display arbitration module and the full speed USB switch, after receiving the switching command;

the video conversion module is configured for converting the video signal outputted by the second system into a signal capable of being received by the display device and transmitting the signal to the display arbitration module;

the display arbitration module is configured for shielding the video signal from the north bridge and switching the video signal from the video conversion module to the display device, after receiving the GPIO signal; and the full speed USB switch is configured for switching input of the input signal of the basic input device from the south bridge to the internal low-speed bus interface, after receiving the GPIO signal.

The second system further comprises an internal high-speed bus interface for data interaction between the first system and the second system.

The second system further comprises a high-speed USB interface and a high-speed USB device connected to the high-speed USB interface, and wherein the switching unit further comprises a high-speed USB switch connected between the internal high-speed bus interface of the second system and the south bridge of the first system, the high-speed USB device comprises at least a movable hard disk, a flash disk or an MP3 player; and the high-speed USB switch is configured for switching off the connection between the south bridge and the internal high-speed bus interface when the second system accesses the high-speed USB device, and maintaining the connection between the south bridge and the high-speed bus interface when the second system does not access the high-speed USB device.

The second system further comprises: an audio output module for outputting the audio signal processed by the embedded processor; and a network connection module for implementing data connection between the second system and external network equipment.

The basic input device comprises at least a keyboard, a touchpad, a mouse or a track point.

The nonvolatile memory comprises a Nandflash that has a capacity at least larger than 512 MB.

The above technical solutions have the following advantages over the conventional techniques.

With the above hybrid-system computer comprising a first system and a second system having a lower power consumption than the first system in an operating state, in the case that only low power consumption applications are required, e.g., in the case of network access, document processing, music playing, video playing, the first system is caused to enter a non-operating state, such as standby, dormancy, power-off, and the second system is put into an operating state. When the second system is operating, parts of the first system consuming most power are all turned off, and all of data processing operations with low power consumption are performed by the second system. The second system and the first system share a display device and a basic input device, such as a keyboard, a touchpad, etc. The first system is switched to only when high power consumption and processing capabilities are required, e.g., at the time of playing a large-scale 3D game. In this way, the power consumption of the computer system can be effectively reduced.

If operations with low power consumption are performed by the second system, the power consumption can be significantly reduced. In particular, for a laptop computer, its battery life can be extended in multiples. For example, with the same battery, it can last 2 hours in the case of playing music by the first system, and it can last 30 hours in the case of playing music by the second system. Apparently, the present invention has the advantage of reducing power consumption.

BRIEF DESCRIPTION OF THE DRAWINGS

The above and other objects, features and advantages of the present invention will be more apparent from the drawings. The same reference number indicates the same part throughout the figures. The figures are not scaled according to the actual size, but are intended to illustrate the present invention.

DETAILED DESCRIPTION OF THE PREFERRED EMBODIMENTS

Figure 1:
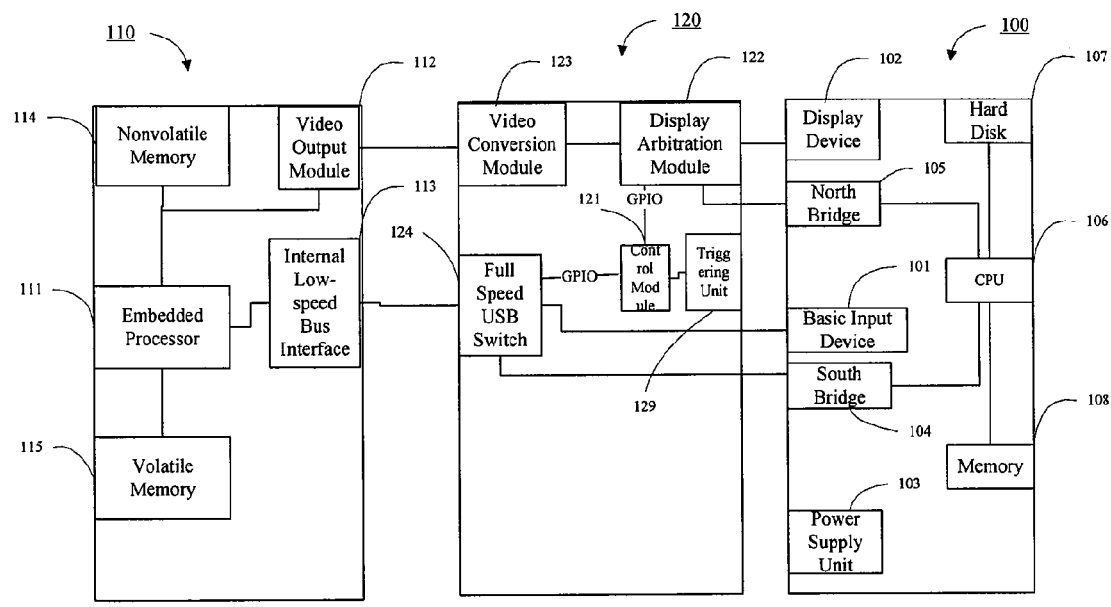
FIG. 1 is a schematic diagram illustrating the system architecture of a hybrid-system computer according to a first embodiment of the present invention.

A detailed description of implementations according to the present invention will be given below in conjunction with the drawings so that the above objects, features and advantages of the present invention become more apparent.

The description below sets forth many details to facilitate understanding of the present invention. However, the present invention can also be implemented in a manner other than those described herein. Those skilled in the art can envisage variations without departing from the spirit and scope of the present invention. Therefore, the present invention is not limited to the specific embodiments disclosed below.

Moreover, the present invention is described in conjunction with the figures. Sectional views of apparatuses and mechanisms are exaggerated not to scale, for illustration of the present invention. The figures shows examples intended only to illustrate but not to limit the present invention. Additionally, three dimensional space sizes of length, width and depth should be considered in practical applications.

With constant improvement of performance of a computer system, power consumption becomes increasingly higher. In most situations, however, low power consumption and processing capabilities is sufficient to meet a user's work requirement, for example, document editing, music playing, network browsing, etc. High processing speed and power consumption requirement are needed only in some infrequent special situations, e.g., running a large-scale 3D game, high-quality image or video processing, etc. Therefore, in most cases, a computer system may provide excessively high processing capabilities to the user, resulting in unnecessary power consumption and waste of energy resources.

The conventional computer system generally employs a power supply management scheme for setting a plurality of states, such as dormancy, sleep and standby, for the computer system, and different power supply schemes are used in the respective states. For example, screen luminance is reduced during music playing, or a processing speed of CPU is lowered when during document edition. No matter which state is entered, main hardware devices of the computer system are still running and thus consuming electric power to some extent. Therefore, this technique for reducing the power consumption of the computer system is not significantly effective.

In view of the above, the present invention provides a hybrid-system computer and a system switching method thereof. The hybrid-system computer comprises a first system, a second system and a power supply unit, wherein the power supply unit is connected to the first system and the second system, respectively, and wherein power consumption in an operating state of the second system is lower than that in an operating state of the first system, the hybrid-system computer further comprises:

a triggering unit configured for obtaining a switching command when the first system is in an operating state and the second system is in a non-operating state; and a switching unit connected to the triggering unit, the first system and the second system, respectively, and configured for receiving the switching command and controlling the first system to enter a non-operating state and the second system to enter an operating state based on the switching command.

The hardware architecture of the first system is identical to that of a conventional computer system, and further includes, for example, a CPU, a mainboard chip set, an internal memory, a hard disk, etc. When high processing capabilities are required, the first system is in a normal operating state. Respective hardware devices of the second system have lower data operation and processing capabilities and accordingly consume less electric power, compared to the hardware devices of the first system. When low data processing capabilities are required, the first system is brought into a non-operating state, and the switching unit switches to the second system for operation. At this moment, the devices of the first system consuming most of power are all turned off, and all of data processing operations with lower power consumption are performed by the second system. The second system and the first system share the display device and the basic input device of the first system. The first system is only switched back to when higher power consumption and higher processing capabilities are required.

Embodiments are described below by taking a laptop of a hybrid-system computer as example.

First Embodiment

FIG. 1 is a schematic diagram illustrating the system architecture of the hybrid-system computer according to the first embodiment of the present invention. This hybrid-system computer comprises a first system 100, a second system 110, a power supply unit 103, a switching unit 120 and a triggering unit 129.

The power supply unit 103 obtains electric power from a rechargeable battery or a power supply of the laptop computer and supplies power to the first system 100, the second system 110, the triggering unit 129 and the switching unit 120.

The hybrid-system computer further comprises a basic input device 101 and a display device 102.

The basic input device 101 comprises, but is not limited to, a keyboard, a touchpad, a mouse and a track point. The display device 102 comprises, but is not limited to, a liquid crystal display (LCD) and a light emitting diode (LED) display.

The first system 100 comprises a south bridge 104, a north bridge 105, a CPU 106, a hard disk 107 and a memory 108.

In addition to the functions of a north bridge in a conventional laptop computer, the north bridge 105 is further configured for processing a video signal of the first system and inputting it to the switching unit. In addition to the functions of a south bridge in the conventional laptop computer, the south bridge 104 is further configured for receiving and processing an input signal input from the basic input device via the switching unit. The CPU 106, the hard disk 107 and the memory 108 can be any of the conventional CPUs, hard disks and memories that are compatible with each other. Other hardware devices of the above first system are similar to those of the conventional laptop computer, and thus detailed description thereof is omitted.

The second system 110 comprises an embedded processor 111, a video output module 112, an internal low-speed bus interface 113, a nonvolatile memory 114 and a volatile memory 115.

The nonvolatile memory 114 is configured for storing data permanently. It has a function equivalent to the hard disk of the first system. The nonvolatile memory 114 comprises, but is not limited to, a Nandflash that has a capacity of at least larger than 512 MB (megabyte). Compared to the hard disk, the Nandflash has lower power consumption, no noise, a small size, a low cost and is convenient in management. Therefore, it is more suitable for the second system.

The volatile memory 115 is configured for obtaining data from the nonvolatile memory 114 and storing the data temporarily. It has a function equivalent to the memory of the first system. An embedded memory with low power consumption, such as the volatile memory, is small in input voltage, size and power consumption.

The embedded processor 111 is configured for obtaining data from the volatile memory 115 based on the received input signal from the basic input device 101, and performing operation and processing on the data. Compared to the CPU 106 of the first system 100, this embedded processor 111 has lower data processing capabilities, which can only meet the requirements of playing music, editing a document, etc. But the embedded processor 111 has lower power consumption when it is running, and thus can save a large amount of power. Consequently, the power consumption in an operating state of the second system is less than that in an operating state of the first system.

The video output module 112 is configured for inputting the video signal generated after the processing of the embedded processor 111 to the switching unit 120. The internal low-speed bus interface 113 is configured for receiving, via the switching unit 120, the input signal inputted from the basic input device 101 and transmitting it to the embedded processor 111.

The triggering unit 129 is configured for obtaining a switching command when the first system 100 is in an operating state and the second system 110 is in a non-operating state. The triggering unit 129 can be a switch triggering key or a switch triggering software module.

The switching unit 120 is connected to the triggering unit 129, the first system 100 and the second system 110, respectively, and configured for receiving the switching command and controlling the first system 100 to enter a non-operating state and the second system 110 to enter an operating state based on the switching command. The non-operating state can be any of dormancy, sleep, standby and power-off states.

Specifically, the switching unit 120 can comprise a control module 121, a display arbitration module 122, a video conversion module 123 and a full speed USB switch 124.

The control module 121 is configured for transmitting a control command to each of the first system 100 and the second system 110, after receiving the switching command. The first system 100 transits from the operating state to the non-operating state after receiving the control command, and the second system 110 transits from the non-operating state to the operating state after receiving the control command.

The control module 121 is further configured for transmitting a general purpose input/output (GPIO) signal to each of the display arbitration module 122 and the full speed USB switch 124, after receiving the switching command. This GPIO signal refers actually to an instruction including a switching direction transmitted from the control module 121 to the display arbitration module 122 and the full speed USB switch 124, respectively. For example, when switching is performed from the first system 100 to the second system 110, a GPIO signal with a high level is transmitted to the display arbitration module 122 and the full speed USB switch 124, respectively, and when switching is performed from the second system 110 to the first system 100, a GPIO signal with a low level is transmitted to the display arbitration module 122 and the full speed USB switch 124, respectively.

The video conversion module 123 is configured for converting the video signal outputted by the video output module 112 of the second system 110 into a signal that can be received by the display device 102, and transmitting it to the display arbitration module 122.

The display arbitration module 122 is configured for, after receiving the GPIO signal, shielding the video signal from the north bridge 105 of the first system 100 and transmitting the video signal from the video conversion module 123 of the switching unit 120 to the display device 102, so as to implement switching of the display signal between the first system 100 and the second system 110.

The full speed USB switch 124 is configured for, after receiving the GPIO signal, switching input of the input signal of the basic input device 101 from the south bridge 104 of the first system 100 to the internal low-speed bus interface 113 of the second system 110, so as to implement switching of the input signal between the first system 100 and the second system 110.

Both the first system 100 and the second system 110 also comprise operating system software and application software compatible with each other. Preferably, the application software of the second system 110 is a reduced version of the corresponding application software of the first system 100. This will increase utilization efficiency of the software and reduce occupancy of resources of the second system 110.

A method for switching between the first system and the second system comprises first pressing the switch triggering key or starting the switch triggering software module so that the triggering unit obtains a switching command. Then, the switching unit transmits a control command to the first system and the second system, respectively, after receiving this switching command. The first system transits from the operating state to the non-operating state after receiving the control command, and the second system transits from the non-operating state to the operating state after receiving the control command. When the second system transits from the non-operating state to the operating state, the switching unit shields the video signal of the first system, switches input of the video signal of the second system to the display device, and switches input of the input signal of the basic input device to the second system.

With reference to the schematic diagram of the system architecture shown in FIG. 1, the video signal and the input signal are switched in parallel for the first system 100 and the second system 110. The switching of the video signal comprises Steps A1 through A3:

Step A1: the control module 121 transmits the GPIO signal to the display arbitration module 122;

Step A2: the video conversion module 123 converts the video signal outputted by the second system 110 into a signal that can be received by the display device 102, and transmitting it to the display arbitration module 122; and Step A3: the display arbitration module 122, after receiving the GPIO signal, shields the video signal from the north bridge 105 and switches the video signal from the video conversion module 123 to the display device 102.

The switching of the input signal comprises Steps B1 and B2:

Step B1: the control module 121 transmits the GPIO signal to the full speed USB switch 124; and Step B2: the full speed USB switch 124, after receiving the GPIO signal, switches input of the input signal of the basic input device 101 from the south bridge 104 to the internal low-speed bus interface 113.

For example, for the above laptop having the hybrid-system computer, the first system 100 of the computer is in an operating state, in which the hardware devices, such as the CPU 106, the hard disk 107, the memory 108 and the like, are all running at a high speed. Meanwhile, the second system 110 is in a non-operating state.

When the second system is required, the switch triggering key is pressed or the switch triggering software module is started, and thus the triggering unit 129 obtains a switching command. The control module 121 transmits a GPIO signal with a high level to the display arbitration module 122 and the full speed USB switch 124, respectively, after receiving the command.

After receiving the high-level GPIO signal, the display arbitration module 122 shields the video signal inputted from the north bridge 105 of the first system 100 and turns on communication connection with the video conversion module 123. The display arbitration module 122 receives, from the video conversion module 123, the video signal from the second system 110 and transmits it to the display device 102. The video conversion module 123 converts the video signal outputted by the video output module 112 into a signal that can be received by the display device 102. At this moment, the display device 102 outputs the video signal of the second system 110.

After receiving the high-level GPIO signal, the full speed USB switch 124 switches off communication connection with the south bridge 104 of the first system 100 and switches on communication connection with the internal low-speed bus interface 113 of the second system 110. At this time, the input signal from the basic input device 101 can be transmitted to the internal low-speed bus interface 113 through the full speed USB switch 124. Then, the embedded processor 111 can detect a new USB device (i.e., the basic input device 101). The second system 110 starts to load a corresponding driver. After the driver is successfully loaded, the second system 110 loads a corresponding input application. In the environment of the second system, the basic input device 101 is identified as a low-speed USB device, and the input act by a user to the basic input device 101 will be transmitted to the second system 110 for a response.

After the switching is completed, the first system 100 of the computer is in the non-operating state such as standby, dormancy and the like, in which the hardware devices, such as the CPU 106, the hard disk 107, the memory 108 and the like, are all turned off. On the other hand, the second system 110 is in the operating state. Power is still supplied by the power supply unit 103 of the first system 100. The user can perform operations that require only lower processing capabilities. When an operation that requires higher processing capabilities is to be performed, the user can press the switch triggering key or activate the switch triggering software module again, so that the triggering unit 129 obtains a switching command. The control module 121 transmits the GPIO signal with a low level to the display arbitration module 122 and the full speed USB switch 124, respectively.

After receiving the low-level GPIO signal, the display arbitration module 122 shields the video signal from the video conversion module 123, receives the video signal from the north bridge 105 of the first system 100 and transmits it to the display device 102. At this time, the display device 102 outputs the video signal of the first system 100.

The full speed USB switch 124 switches on communication connection with the south bridge 104 of the first system 100 and switches off communication connection with the internal low-speed bus interface 113 of the second system 110 after receiving the low-level GPIO signal. The input signal of the basic input device 101 is transmitted through the full speed USB switch 124 to the south bridge 104 for processing. In this way, the first system 100 is restored to an operating state, and the second system 110 enters a non-operating state.

With the above hybrid-system computer, in the case that only low power consumption applications are required, e.g., in the case of network access, document processing, music playing, video playing, the first system is caused to enter a non-operating state, such as standby, dormancy, power-off, and the second system is put into an operating state. When the second system is operating, parts of the first system consuming most power are all turned off, and all of data processing operations with low power consumption are performed by the second system. The first system is switched to only when high power consumption and processing capabilities are required, e.g., at the time of playing a large-scale 3D game. The second system and the first system share a display device and a basic input device, such as a keyboard, a touchpad, etc. For a user, the input and output operations of the two systems seems identical to each other, and reduced versions of operating system and application software of the first system can be provided in the second system.

If operations with low power consumption are performed by the second system, the power consumption can be significantly reduced. In particular, for a laptop computer, its battery life can be extended in multiples. For example, with the same battery, it can last 2 hours in the case of playing music by the first system, and it can last 30 hours in the case of playing music by the second system. Apparently, the present invention has the advantage of reducing power consumption Moreover, switching between the first system and the second system is convenient. By the simple operation of pressing a switch triggering key or starting a switch triggering software module, the use can realize the switching in a easy and fast manner.

The second system of the above hybrid-system computer can further comprises an internal high-speed bus interface, which will be specifically described in the following embodiment.

Second Embodiment

Figure 2:
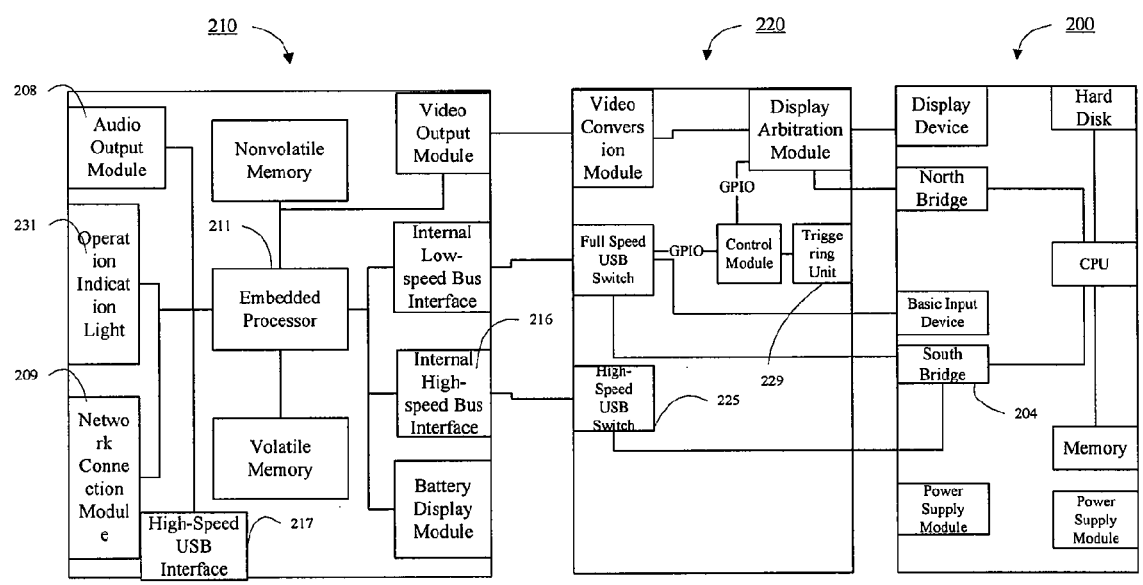
FIG. 2 is a schematic diagram illustrating the system architecture of a hybrid-system computer according to a second embodiment of the present invention.

FIG. 2 is a schematic diagram illustrating the architecture of the hybrid-system computer according to the second embodiment. As illustrated in FIG. 2, the hybrid-system computer comprises a first system 200, a second system 210, a power supply unit, a triggering unit 229 and a switching unit 220. The second embodiment differs from the first embodiment in that the second system 210 further comprises:

an internal high-speed bus interface 216 for data interaction between the first system 200 and the second system 210;

a high-speed USB interface 217 and a high-speed USB device (not shown) connected to the high-speed USB interface 217, the high-speed USB device comprises at least a movable hard disk, a flash disk or an MP3 player.

The switching unit 220 further comprises a high-speed USB switch 225 connected between the internal high-speed bus interface 216 of the second system 210 and the south bridge 204 of the first system 200, wherein the high-speed USB switch 225 is configured for switching off the communication connection between the south bridge 204 and the internal high-speed bus interface 216 when the second system 210 accesses the high-speed USB device, and maintaining the connection between the south bridge 204 and the high-speed bus interface 216 when the second system 210 does not access the high-speed USB device.

No matter which of the second system 210 and the first system is in an operating state, the two systems can transmit and share data through the high-speed USB bus between the internal high-speed bus interface 216 and the south bridge 204, or can perform control information interaction through a low-speed SMBus control bus. Necessary data synchronization can also be performed between the two systems before the first system 200 is turned off as well as after it is restored to operation.

The second system can also comprises an audio output module 208, a network connection module 209, an operation indication light 231, etc. The audio output module 208 is configured for outputting the audio signal processed by the embedded processor. The network connection module 209 is configured for implementing data connection between the second system 210 and external network equipment.

Other components of the hybrid-system computer of the second embodiment and its system switching method are similar to those in the first embodiment. A detailed description thereof is thus omitted.

Preferably, each of the first system and the second system can also have a battery display module (not denoted in the figure) for obtaining a battery duration from the power supply unit and transmitting it to the display device for display. Specifically, when the first system is operating, an SMBus command can be issued by the battery display module of the first system, and the battery duration can be obtained from the power supply unit and displayed on the display device. When the second system is operating, an SMBus command can also be issued by the battery display module of the second system, and the remaining part of the battery duration is obtained from the power supply unit and displayed. For example, a user finds that, in the first system, the remaining electric power of the battery can last 3 hours. After switching to the second system, the user will find that the battery can support operations of up to 30 hours. With such intuitive experience, the user will recognize the advantage of the second system in terms of power consumption and battery consumption.

The foregoing is intended to describe preferred embodiments of the present invention, other than limiting the present invention in any manner. It will be noted that the hybrid-system computer is described in the above embodiments by taking a laptop computer as example. In addition, the hybrid-system computer of the present invention can also be applied to other computer systems, such as a palm computer, a smart handset and a personal computer.

Although the present invention has been disclosed above with the preferred embodiments, these embodiments are not intended to limit the present invention. Those skilled in the art can make many possible variations and modifications to the present invention or envisage many equivalents by applying the method and technical contents disclosed, within the scope of the present invention. Therefore, any content within the present invention, any simple modification, equivalent and variation to the above embodiments are encompassed by the scope of the present invention.

What is claimed is:

1. A hybrid-system computer comprising a first system, a second system and a power supply unit, wherein the power supply unit is connected to the first system and the second system, respectively, and wherein power consumption in an operating state of the second system is lower than that in an operating state of the first system, the hybrid-system computer further comprising:

a triggering unit configured for obtaining a switching command when the first system is in an operating state and the second system is in a non-operating state; and a switching unit connected to the triggering unit, the first system and the second system, respectively, and configured for receiving the switching command and controlling the first system to enter a non-operating state and the second system to enter an operating state based on the switching command;

wherein the switching unit is implemented as a hardware unit comprising a first switch connected between the first system and an internal low-speed bus interface of the second system, and a second switch connected between the first system and an internal high-speed bus interface of the second system, wherein the first switch is configured to, when the second system transits from the non-operating state to the operating state, switch input of an input device of hybrid-system computer from the first system to the second system, and wherein the second switch is configured to switch on and off a channel for data interaction between the first system and the internal high-speed bus interface of the second system, according to the operation status of the second system.

2. The hybrid-system computer according to claim 1, wherein the switching unit comprises a control module for transmitting a control command to each of the first system and the second system, after receiving the switching command, the first system transits from the operating state to the non-operating state after receiving the control command, and the second system transits from the non-operating state to the operating state after receiving the control command.

3. The hybrid-system computer according to claim 2, wherein the triggering unit is a switch triggering key or a switch triggering software module.

4. The hybrid-system computer according to claim 2, further comprising a display device, the switching unit is further configured for, when the second system transits from the non-operating state to the operating state, shielding a video signal of the first system, switching input of a video signal of the second system to the display device, and switching input of an input signal of the input device to the second system.

5. The hybrid-system computer according to claim 4, wherein the first system comprises a south bridge and a north bridge, the north bridge is configured for processing the video signal of the first system and inputting it to the switching unit; and the south bridge is configured for receiving and processing the input signal of the input device inputted via the switching unit.

6. The hybrid-system computer according to claim 5, wherein the second system comprises an embedded processor, a video output module, a nonvolatile memory and a volatile memory, the nonvolatile memory is configured for storing data permanently;

the volatile memory is configured for obtaining data from the nonvolatile memory and storing data temporarily;

the embedded processor is configured for, based on the received input signal of the input device, obtaining data from the volatile memory and performing operations and processing on the data;

the video output module is configured for inputting to the switching unit the video signal generated after the processing by the embedded processor; and the internal low-speed bus interface is configured for receiving the input signal of the input device input via the switching unit and transmitting it to the embedded processor.

7. The hybrid-system computer according to claim 6, wherein the switching unit further comprises a display arbitration module, and a video conversion module, and the first switch comprises a full speed USB switch, wherein the control module is further configured for transmitting a GPIO signal to each of the display arbitration module and the full speed USB switch, after receiving the switching command;

wherein the video conversion module is configured for converting the video signal outputted by the second system into a signal capable of being received by the display device and transmitting the signal to the display arbitration module;

wherein the display arbitration module is configured for shielding the video signal from the north bridge and switching the video signal from the video conversion module to the display device, after receiving the GPIO signal; and wherein the full speed USB switch is configured for switching input of the input signal of the basic input device from the south bridge to the internal low-speed bus interface, after receiving the GPIO signal.

8. The hybrid-system computer according to claim 6, wherein the internal high-speed bus interface is used for data interaction between the first system and the second system.

9. The hybrid-system computer according to claim 6, wherein the second system further comprises a high-speed USB interface and a high-speed USB device connected to the high-speed USB interface, and wherein the second switch comprises a high-speed USB switch connected between the internal high-speed bus interface of the second system and the south bridge of the first system, the high-speed USB device comprises at least one of a removable hard disk, a flash disk or an MP3 player; and the high-speed USB switch is configured for switching off the connection between the south bridge and the internal high-speed bus interface when the second system accesses the high-speed USB device, and maintaining the connection between the south bridge and the high-speed bus interface when the second system does not access the high-speed USB device.

10. The hybrid-system computer according to claim 6, wherein the second system further comprises: an audio output module for outputting audio signal processed by the embedded processor; and a network connection module for implementing data connection between the second system and external network equipment.

11. The hybrid-system computer according to claim 4, wherein the input device comprises at least one of a keyboard, a touchpad, a mouse or a track point.

12. The hybrid-system computer according to claim 6, wherein the nonvolatile memory comprises a Nandflash that has a capacity at least larger than 512 MB.

* * * * *